(12) United States Patent
Wu et al.

(10) Patent No.: US 7,575,831 B2
(45) Date of Patent: Aug. 18, 2009

(54) CO-PRECIPITATION METHOD FOR THE PREPARATION OF $LI_{1+x}NI_{1-y}CO_yO_2$-BASED CATHODE MATERIALS

(75) Inventors: She-Huang Wu, Taipei (TW); Wen-Jen Liu, Taipei (TW); ChihWei Yang, Taipei (TW)

(73) Assignee: Tatung Company, Taipei (TW)

( * ) Notice: Subject to any disclaimer, the term of this patent is extended or adjusted under 35 U.S.C. 154(b) by 333 days.

(21) Appl. No.: 11/265,093

(22) Filed: Nov. 3, 2005
(Under 37 CFR 1.47)

(65) Prior Publication Data
US 2006/0171876 A1    Aug. 3, 2006

(30) Foreign Application Priority Data
Nov. 3, 2004  (TW) ............................... 93133520 A

(51) Int. Cl.
*H01M 4/00*  (2006.01)
(52) U.S. Cl. ........................ 429/223; 429/224; 429/314; 429/231.8; 429/333; 423/594.4; 423/138; 423/594; 423/599; 423/594.2; 252/519.1; 252/503; 252/518.1
(58) Field of Classification Search ........................ None
See application file for complete search history.

(56) References Cited

U.S. PATENT DOCUMENTS

| 6,210,834 B1 * | 4/2001 | Kweon et al. ............. 429/231.3 |
| 6,395,250 B2 * | 5/2002 | Matsubara et al. ........ 423/594.4 |
| 2003/0206852 A1 * | 11/2003 | Yang et al. ................ 423/594.4 |

FOREIGN PATENT DOCUMENTS

JP             10214624         8/1998

* cited by examiner

*Primary Examiner*—Melvin C Mayes
*Assistant Examiner*—Smita Patel
(74) *Attorney, Agent, or Firm*—Bacon & Thomas, PLLC

(57) ABSTRACT

A method for preparing $Li_{1+x}Ni_{1-y}Co_yO_2$ cathode materials is disclosed, wherein $-0.2 \leq x \leq 0.2$ and $0.05 \leq y \leq 0.5$. The method includes the following steps: (A) adding a first solution into a second solution to form a mixed solution, wherein the first solution is a saturated lithium hydroxide solution, the second solution contains nickel salt and cobalt salt, the mole ratio of the lithium ion in the first solution to nickel ion and cobalt ion in the second solution ranges from 1.5:1 to 5:1, and the molar ratio of nickel ion to cobalt ion in the second solution is 1−y:y; (B) stirring the mixed solution; (C) filtering the mixed solution and obtaining a co-precipitated precursor, wherein the molar ratio of lithium ion:nickel ion:cobalt ion is 1+x:1−y:y; and (D) heating the co-precipitated precursor at a temperature higher than 600° C.

20 Claims, 2 Drawing Sheets

CO-PRECIPITATION METHOD FOR THE PREPARATION OF $Li_{1+x}Ni_{1-y}Co_yO_2$-BASED CATHODE MATERIALS

TECHNICAL FIELD

The present invention relates to a method for preparing cathode materials and, more particularly, to a method for preparing lithium cobalt nickel oxide cathode materials.

BACKGROUND OF THE INVENTION

The use of portable electronic instruments is increasing as electronic equipment gets smaller and lighter due to developments in high-tech electronic industries. Studies on rechargeable lithium batteries are actively being pursued in accordance with the increasing need for a battery having a high energy density for use as a power source in these portable electronic instruments.

Lithium cobalt nickel oxide is one of the cathode materials for rechargeable lithium batteries. However, the procedure of the conventional preparation method for lithium cobalt nickel oxide is very complex. Conventionally, the nickel salt and cobalt salt are firstly reacted with an alkaline solution, such as potassium hydroxide or sodium hydroxide, to form a co-precipitate of nickel hydroxide and cobalt hydroxide. The co-precipitate is then washed repeatedly with water to remove the residual potassium ions and sodium ions. Afterwards, the washed co-precipitate of nickel and cobalt hydroxide is thoroughly mixed with the lithium hydroxide and then followed by a solid reaction method for converting into layer-structured lithium nickel cobalt oxide. In the conventional solid reaction method, a long period of mixing and a long period of high temperature heat treatment are necessary to obtain the desired powders. Therefore, the conventional process is time and energy-consuming. Furthermore, the purity and the uniformity of the powders resulted from the solid reaction method are usually low due to the contamination occurred in mixing and grinding and the incomplete mixing.

SUMMARY OF THE INVENTION

The present invention relates to a method for preparing cathode materials represented by formula (1):

$$Li_{1+x}Ni_{1-y}Co_yO_2 \qquad (1)$$

wherein $-0.2 \leq X \leq 0.2$ and $0.05 \leq Y \leq 0.5$. The method comprises the following steps: (A) A first solution is added into a second solution thereby to form a mixed solution, wherein the first solution is a saturated lithium hydroxide solution, the second solution contains nickel salt and cobalt salt, the mole ratio of the Li ion in the first solution to Ni ion and Co ion in the second solution ranges from 1.5:1 to 5:1, and the molar ratio of Ni ion to Co ion in the second solution is 1−y:y. (B) The mixed solution is stirred. (C) The mixed solution is filtered to obtain a co-precipitated precursor, wherein the molar ratio of lithium ion: nickel ion: cobalt ion is 1+x:1−y:y. (D) The co-precipitated precursor is heated at a temperature higher than 600° C. In other words, the present invention forms the co-precipitated precursor of lithium nickel cobalt oxide directly by mixing "excessive" amount of the saturated solution of lithium hydroxide with solution of the nickel and the cobalt salt. The co-precipitated precursor is then heat-treated to obtain lithium nickel cobalt oxide. Compared with the conventional method, the method of the present invention is easier, the product formed by the present invention is more uniform, the processing time is shorter, and the temperature of heat treatment is lower than that of conventional method. Moreover, the contamination is prevented because no grinding process is needed, and the composition of the cathode material therefore can be controlled easily.

The nickel salt used in the method for preparing a cathode material of the present invention can be any conventional nickel salt. Preferably, the nickel salt has a high solubility in water. More preferably, the nickel salt is nickel nitrate, nickel acetate, nickel chloride, or nickel sulfate. The cobalt salt used in the present invention can also be any conventional cobalt salt. Preferably, the cobalt salt has a high solubility in water. More preferably, the cobalt salt is cobalt nitrate, cobalt acetate, cobalt chloride, or cobalt sulfate. The amount of lithium ion contained in the first solution at step (A) of the present invention is more than that of the amount of nickel and cobalt ions contained in the second solution. Preferably, the moles of lithium ion in the first solution is 1.5 to 5 times of that of nickel and cobalt ions in the second solution. The time for heat treatment at step (C) of the present invention is more than 4 hours. Preferably, the time for heat treatment at step (C) is ranging from 8 to 12 hours.

In addition, another metal salt can also be added at step (A) of the present invention to substitute part of the cobalt salt so as to prepare cathode material doped with another metal ion. The applicable molar ratio of the metal salt in the cathode material ranges from 0 to 0.1. The metal salt can be any conventional metal salt. Preferably, the metal salt is aluminum salt, magnesium salt, zinc salt, manganese salt, or titanium salt. In other words, the present invention can form a doped cathode material without additional steps. Therefore, the method of the present invention is a very simple and effective preparation process.

DETAILED DESCRIPTION OF THE PREFERRED EMBODIMENTS

Figure 1:
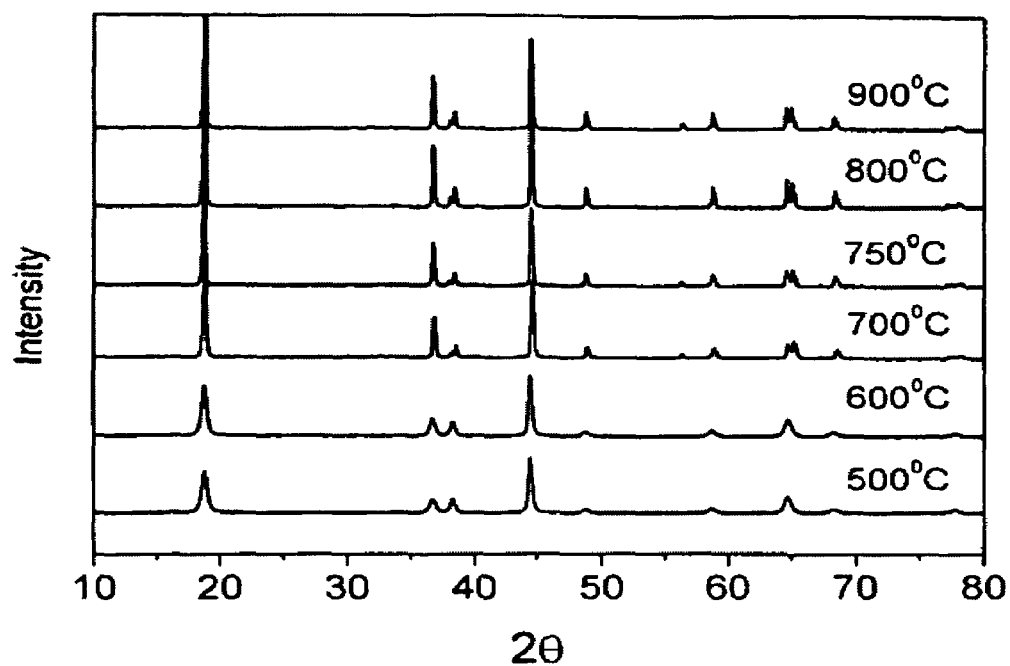
FIG. 1 shows the X-ray diffraction pattern of the cathode material prepared according to Embodiment 1 of the present invention.

The molar ratio of nickel ion to cobalt ion contained in the second solution is based on the stoichiometry of the cathode material prepared to be formed by the present invention. In the present embodiment, the molar ratio of nickel ion to cobalt ion is 0.8:0.2. The nickel salt and cobalt salt used in the present invention are easily dissolved in the water. In the present embodiment, the nickel salt is nickel nitrate, and the cobalt salt is cobalt nitrate. In the present invention, the amount of lithium ion contained in the first solution is more than that of the amount of nickel and cobalt ions contained in the second solution. Preferably, the mole ratio of the Li ion in the first solution to Ni ion and Co ion in the second solution ranges from 1.5:1 to 5:1. In the present embodiment, the volume of the saturated lithium hydroxide solution is twice of that of the cobalt ion and nickel ion solution, in which the total concentration of cobalt ion and nickel ion is 1 M.

Embodiment 1: Preparation of $LiNi_{0.8}Co_{0.2}O_2$

Nickel nitrate and cobalt nitrate are dissolved in the water to form a solution with 1M metal ion concentration (second solution), wherein the molar ratio of nickel nitrate to cobalt nitrate is 0.8 to 0.2. Next, a saturated lithium hydroxide solution (first solution) with twice the volume of the metal ion solution is added into the metal ion solution. After a thorough mixing, the mixed solution is filtered to obtain the precursor of $LiNi_{0.8}Co_{0.2}O_2$ cathode material. Afterwards, the heat treatment of the precursor is performed by increasing the temperature at a rate of 1° C./min to 600° C., 700° C., 750° C., 800° C., or 900° C., respectively and then keeping at the target temperature for 8 hours in an oxygen atmosphere. After turning off the heating source, the precursor is cooled slowly to obtain the $LiNi_{0.8}Co_{0.2}O_2$ powder. The prepared $LiNi_{0.8}Co_{0.2}O_2$ powder is then investigated by a scanning electron microscope (SEM). From the SEM, the synthesized $LiNi_{0.8}Co_{0.2}O_2$ powder is shown to have a diameter around 1 to 2 μm.

Test result a. Analysis of the Composition

The $LiNi_{0.8}Co_{0.2}O_2$ powder is dissolved in an aqueous solution of hydrochloric acid and then diluted to a suitable concentration that can be analyzed by an atomic absorption spectroscopy. From the measurements, the molar ratios of the metal ions in the prepared powders can be calculated.

The present embodiment prepares five lithium nickel cobalt oxides from the same precursor but with different heat-treatment temperatures. The compositions of the prepared powders are listed in Table 1. It can be seen that the compositions of obtained powders are very close to the desired composition ($LiNi_{0.8}Co_{0.2}O_2$). The molar ratio between nickel and cobalt ions (0.8:0.2) in the lithium nickel cobalt oxide prepared by the method of the present invention is in consistent with that of nickel salt and cobalt salt (0.8:0.2) used in the preparing procedure. Therefore, the present invention can be used to prepare $Li_{1+x}Ni_{1-y}Co_yO_2$ powders with predetermined stoichiometry easily by the co-precipitation with excess amount of lithium hydroxide.

TABLE 1

| Heat treatment condition | Metal element | | |
|---|---|---|---|
| | Li | Ni | Co |
| Keeping at 600° C. for 8 hours | 1.08 | 0.8 | 0.204 |
| Keeping at 700° C. for 8 hours | 1.02 | 0.8 | 0.204 |
| Keeping at 750° C. for 8 hours | 1.05 | 0.8 | 0.196 |
| Keeping at 800° C. for 8 hours | 0.99 | 0.8 | 0.195 |
| Keeping at 900° C. for 8 hours | 0.98 | 0.8 | 0.197 | b. X-Ray Diffraction Analysis

The crystalline structure of the prepared lithium nickel cobalt oxides are determined by the X-ray diffraction patterns. As shown in FIG. 1, the X-ray diffraction patterns of the products heat-treated at various temperatures are substantially identical and all belong to a typical $LiNi_{0.8}Co_{0.2}O_2$ crystalline structure. Furthermore, there is no secondary phase observed. Therefore, it is proved that the method of the present invention can produce lithium nickel cobalt oxide with high purity easily and quickly.

c. Cycle Life Test

The powders obtained from the present embodiment, the acetylene carbon black, and the polyvinylidene fluoride (PVDF) with weight ratio of 83:10:7 are mixed in N-methylpyrrolidone (NMP) solvent to form slurry. The slurry is then tape-cast on an Al foil and dried in a vacuum oven. After that, the tape is punched into disk as the positive electrode for further study. The positive electrode, the lithium metal, and suitable electrolyte are used to construct a 2032 coin-type cell for the cycle life test.

Figure 2:
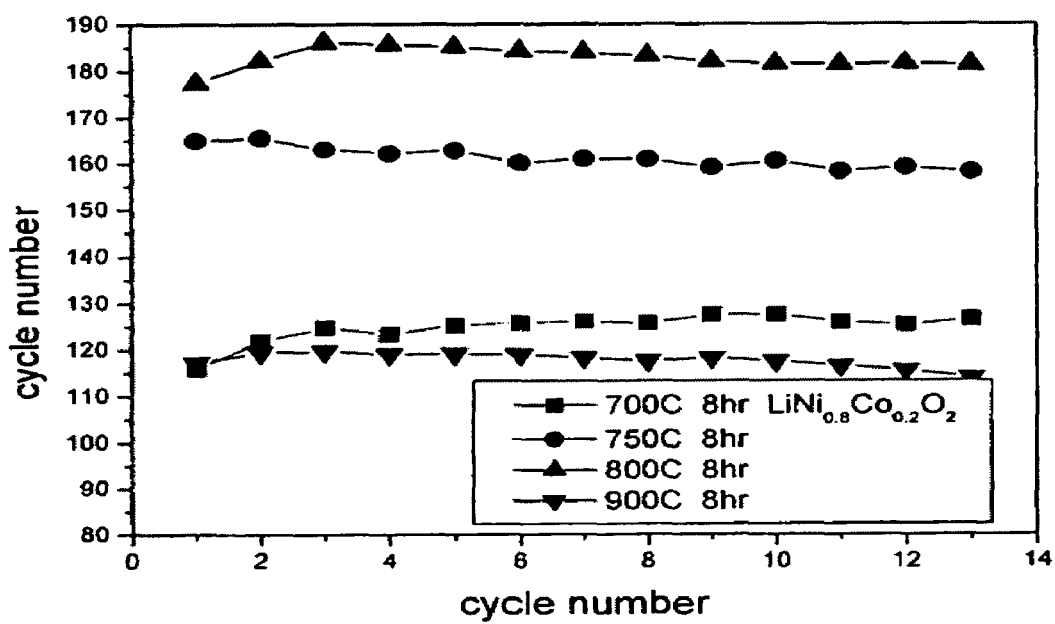
FIG. 2 shows the cycle life characteristic of the cell prepared according to Embodiment 1 of the present invention.

The cycle life test is performed by charging-discharging the cell within the cut-off voltages of 3.0 and 4.3 V with C/10 rate. The results of cycling performance are shown in FIG. 2, the capacity of the cell using the cathode material of the present embodiment does not deteriorate even after 13 cycles. The result indicates that the cathode materials formed by the method of the present invention have an excellent charging-discharging characteristic. Among the cathode materials prepared in the present embodiment, the cathode material prepared at 800° C. exhibits the best charging-discharging performance with initial capacity of 178 mAh/g. However, it still has a capacity of 180 mAh/g after 13 cycles. Apparently, the performance of the cell utilizing the cathode material of the present embodiment is better than that of the commercial lithium battery.

Embodiment 2: Preparation of $LiNi_{0.8}Co_{0.17}Al_{0.03}O_2$

The present embodiment shows a small amount of aluminum ion was doped in the $LiNi_{0.8}Co_{0.2}O_2$ to improve the thermal stability thereof.

First, nickel nitrate, cobalt nitrate, and aluminum nitrate are dissolved in the water with molar ratio of 0.8:0.17:0.03 to form a solution (second solution) with total metal ion concentration of 1 M. Next, a saturated lithium hydroxide solution (first solution) with twice the volume of the metal ion solution is added into the metal ion solution. After a thorough mixing, the mixed solution is filtered to obtain the precursor of $LiNi_{0.8}Co_{0.17}Al_{0.03}O_2$ cathode material. Afterwards, the precursor undergoes a heat treatment at 800° C. in an oxygen atmosphere to form the $LiNi_{0.8}Co_{0.17}Al_{0.03}O_2$ powder. Therefore, the aluminum-doped cathode material is obtained without any additional step.

Test result a. X-ray Diffraction Analysis

Figure 3:
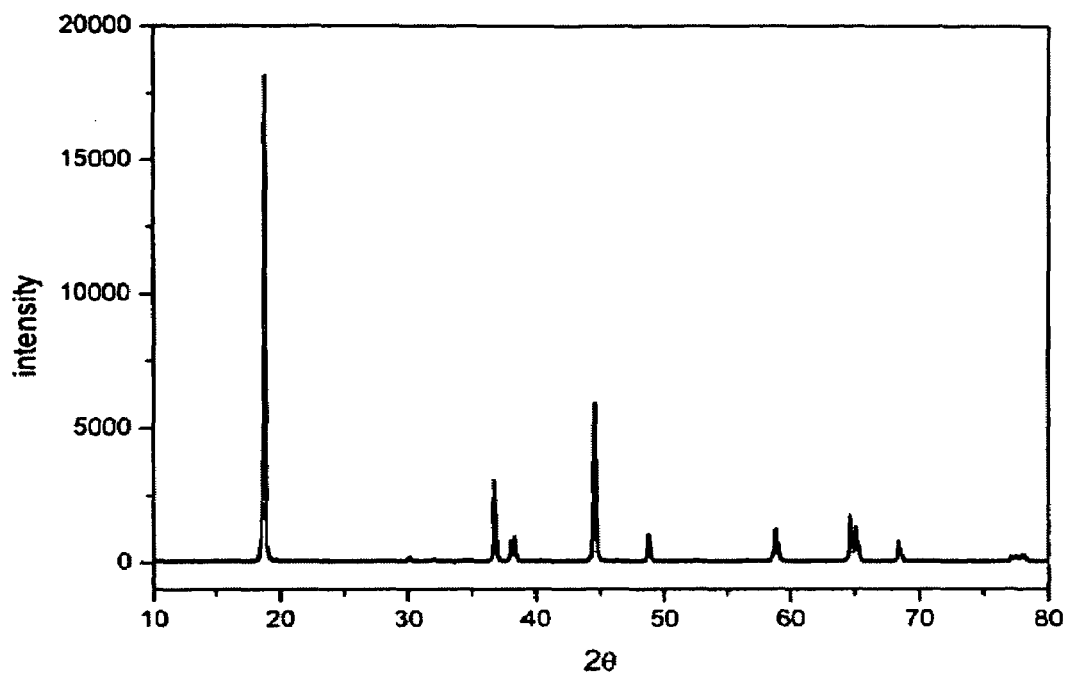
FIG. 3 shows the X-ray diffraction pattern of the cathode material prepared according to Embodiment 2 of the present invention.

As shown in FIG. 3, the X-ray diffraction pattern of the prepared $LiNi_{0.8}Co_{0.17}Al_{0.03}O_2$ is substantially identical to those shown in FIG. 1 and has a typical $LiNi_{0.8}Co_{0.2}O_2$ crystalline structure, without secondary phase being observed.

b. Cycle Life Test

Figure 4:
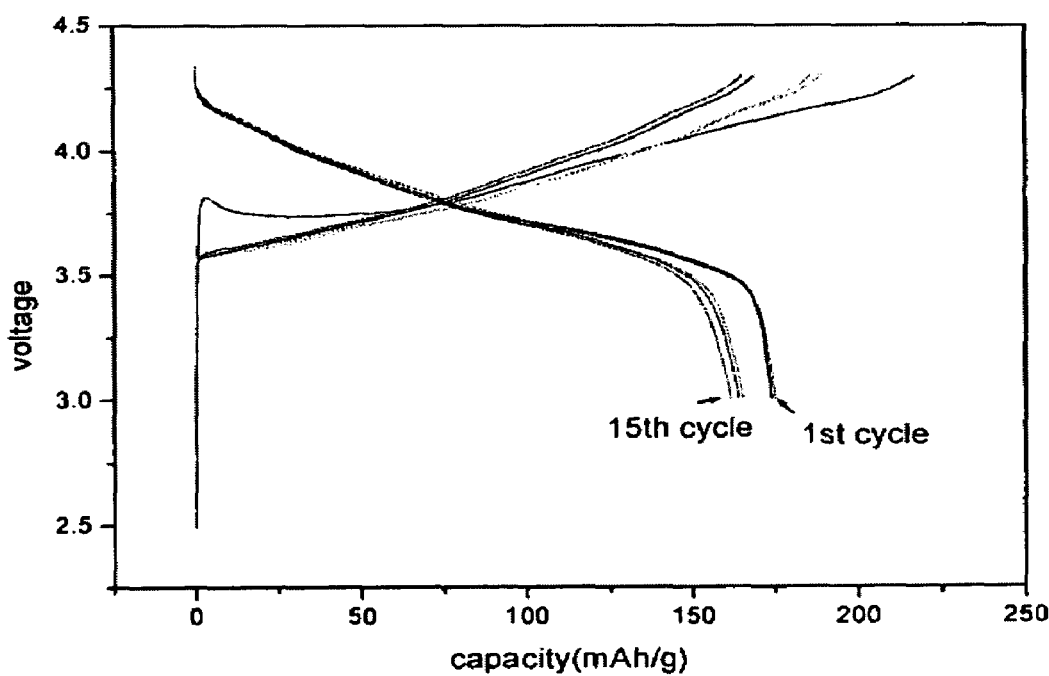
FIG. 4 shows the cycle life characteristic of the cell prepared according to Embodiment 2 of the present invention.

The powder obtained from the present embodiment, the acetylene carbon black, and the polyvinylidene fluoride (PVDF) with weight ratio of 83:10:7 are mixed in N-methylpyrrolidone (NMP) solvent to form slurry. The slurry is then tape-cast on an Al foil and dried to prepare a positive electrode. The positive electrode, the lithium metal, and suitable electrolyte are used to construct a 2032 coin-type cell for cycle life test. The cycle life test is performed by charging-discharging the cell within the cut-off voltages of 3.0 and 4.3 V at C/10 rate. The charging/discharging curves are shown in FIG. 4, the initial discharging capacity of the cell using the cathode material of the present embodiment is 174 mAh/g, and after 15 cycles, it still shows a capacity of 161 mAh/g. It is evident that the performance of the cell utilizing the $LiNi_{0.8}Co_{0.17}Al_{0.03}O_2$ cathode material of the present embodiment is excellent.

The present invention forms the co-precipitate precursor of lithium nickel cobalt oxide directly by adding excessive amount of saturated lithium hydroxide solution into a solution of the nickel salt and cobalt salt. The co-precipitate precursor can be transformed into a crystalline powder after an appropriate heat treatment. Compared with the conventional method, the present invention is much simpler. In addition, the product formed by the method of the present invention is free of contamination and has a well-controlled composition. In particular, the method of the present invention can also be applied to prepare a doped lithium nickel cobalt oxide cathode material easily without any additional step. Therefore, the method proposed by the present invention is obviously superior to the conventional method.

The above detailed description is given by way of example and not intended to limit the invention solely to the embodiments described herein.

The invention claimed is:

1. A method for preparing cathode materials represented by formula (1):

$$Li_{1+x}Ni_{1-y}Co_yO_2 \quad (1)$$

wherein $-0.2 \leq x \leq 0.2$ and $0.05 \leq y \leq 0.5$; consisting essentially of the following steps:
 (A) adding a first solution into a second solution thereby to form a mixed solution, wherein the first solution is a saturated lithium hydroxide solution, the second solution contains nickel salt and cobalt salt, the mole ratio of the lithium ion in the first solution to nickel ion and cobalt ion in the second solution ranges from 1.5:1 to 5:1, and the molar ratio of nickel ion to cobalt ion in the second solution is 1−y:y;
 (B) stirring the mixed solution;
 (C) filtering the mixed solution and obtaining a co-precipitated precursor, wherein the molar ratio of lithium ion: nickel ion: cobalt ion is 1+x:1−y:y; and
 (D) heating the co-precipitated precursor at a temperature higher than 600° C.

2. The method as claimed in claim 1, wherein the nickel salt is nickel nitrate, nickel acetate, nickel chloride, or nickel sulfate.

3. The method as claimed in claim 1, wherein the cobalt salt is cobalt nitrate, cobalt acetate, cobalt chloride, or cobalt sulfate.

4. The method as claimed in claim 1, wherein the heating temperature of step (D) is 600° C. to 900° C.

5. The method as claimed in claim 1, wherein the heating time of step (D) is more than four hours.

6. The method as claimed in claim 1 further comprising adding a metal salt into the second solution at step (A) to prepare doped cathode materials, wherein the molar ratio of the metal salt is less than 0.1, based on the total amount of the cathode materials.

7. The method as claimed in claim 6, wherein the metal salt is an aluminum salt, a magnesium salt, a zinc salt, a manganese salt, or a titanium salt.

8. A method for preparing cathode materials represented by formula (1):

$$Li_{1+x}Ni_{1-y}Co_yO_2 \quad (1)$$

wherein $-0.2 \leq x \leq 0.2$ and $0.05 \leq y \leq 0.5$, said method consisting essentially of:
 (A) adding an excessive amount of a first solution comprising a saturated lithium hydroxide solution with a second solution comprising nickel salt and cobalt salt with a mole ratio of nickel ion to cobalt ion of 1−y:y, and wherein the mole ratio of the lithium ion in the first solution to nickel ion and cobalt ion in the second solution ranges from 1.5:1 to 5:1, and
 (B) mixing said first and second solutions to form a co-precipitated precursor with a mole ratio of lithium ion: nickel ion:cobalt ion of 1+x:1−y:y; and
 (C) filtering the mixed solution and obtaining a co-precipitated precursor, wherein the molar ratio of lithium ion: nickel ion:cobalt ion is 1+x:1−y:y; and
 (D) heating the co-precipitated precursor at a temperature higher than 600° C. to obtain said cathode material.

9. The method as claimed in claim 8, wherein the nickel salt is nickel nitrate, nickel acetate, nickel chloride, or nickel sulfate.

10. The method as claimed in claim 8, wherein the cobalt salt is cobalt nitrate, cobalt acetate, cobalt chloride, or cobalt sulfate.

11. The method as claimed in claim 8, wherein the heating temperature of step (D) is 600° C. to 900° C.

12. The method as claimed in claim 8, wherein the heating time of step (D) is more than four hours.

13. The method as claimed in claim 8, further comprising adding a metal salt into the second solution at step (A) to prepare doped cathode materials, wherein the mole ratio of the metal salt is less than 0.1, based on the total amount of cathode material.

14. The method as claimed in claim 13, wherein the metal salt is an aluminum salt, a magnesium salt, a zinc salt, a manganese salt, or a titanium salt.

15. The method as claimed in claim 8, wherein the second solution comprises nickel nitrate, cobalt nitrate, and aluminum nitrate in a molar ratio of 08:0.17:0.03 to obtain a cathode material having the formula of $LiNi_{0.8}Co_{0.2}Al_{0.03}O_2$.

16. The method as claimed in claim 8, wherein the mole ratio of nickel nitrate to cobalt nitrate is 0.8 to 0.2 and the cathode material has a formula of $LiNi_{0.8}Co_{0.2}O_2$.

17. A method for preparing cathode materials represented by formula (1):

$$Li_{1+x}Ni_{1-y}Co_yO_2 \quad (1)$$

wherein $-0.2 \leq x \leq 0.2$ and $0.05 \leq y \leq 0.5$, said method consisting essentially of:
 (A) obtaing a first solution comprising a saturated lithium hydroxide solution and a second solution comprising nickel salt and cobalt said with a mole ratio of nickel ion to cobalt ion of 1−y:y,
 wherein the mole ratio of the lithium ion in the first solution to nickel ion and cobalt ion in the second solution ranges from 1.5:1 to 5:1;
 (B) mixing said first and second solutions to directly form a co-precipitated precursor with a mole ratio of lithium ion:nickel ion:cobalt ion of 1+x:1−y:y; and
 (C) filtering the mixed solution and obtaining said co-precipitated precursor, with a mole ratio of lithium ion: nickel ion:cobalt ion of 1+x:1−y:y; and
 (D) heating the co-precipitated precursor at a temperature higher than 600° C. to obtain said cathode material.

18. The method as claimed in claim 17, wherein the nickel salt is nickel nitrate, nickel acetate, nickel chloride, or nickel sulfate.

19. The method as claimed in claim 18, wherein the cobalt salt is cobalt nitrate, cobalt acetate, cobalt chloride, or cobalt sulfate.

20. The method as claimed in claim 19, wherein the heating temperature of step (iv) is 600° C. to 900° C.

* * * * *